(12) United States Patent
Liu

(10) Patent No.: US 7,727,666 B2
(45) Date of Patent: Jun. 1, 2010

(54) PORTABLE ELECTRONIC DEVICE

(75) Inventor: Chi-Fang Liu, Nantou County (TW)

(73) Assignee: Qisda Corporation, Taoyuan County (TW)

( * ) Notice: Subject to any disclaimer, the term of this patent is extended or adjusted under 35 U.S.C. 154(b) by 497 days.

(21) Appl. No.: 11/697,126

(22) Filed: Apr. 5, 2007

(65) Prior Publication Data

US 2007/0238013 A1    Oct. 11, 2007

(30) Foreign Application Priority Data

Apr. 10, 2006   (TW) .............................. 95112627 A

(51) Int. Cl.
*H01M 2/10*   (2006.01)
*E05C 1/12*   (2006.01)
(52) U.S. Cl. ......................................... 429/97; 292/170
(58) Field of Classification Search ................... 429/97; 292/163, 170
See application file for complete search history.

(56) References Cited

U.S. PATENT DOCUMENTS

| 7,419,742 | B2 * | 9/2008 | Liu et al. ..................... 429/97 |
| 7,441,813 | B2 * | 10/2008 | Qin et al. .................... 292/163 |
| 7,442,464 | B2 * | 10/2008 | Li .............................. 429/97 |
| 7,512,397 | B2 * | 3/2009 | Liu et al. ................... 429/97 X |
| 2006/0172183 | A1 * | 8/2006 | Chen et al. ..................... 429/97 |

FOREIGN PATENT DOCUMENTS

TW      M243866        9/2004

\* cited by examiner

*Primary Examiner*—Stephen J. Kalafut

(57) ABSTRACT

A portable electronic device. The portable electronic device includes a body, a cover, a button, a movable pin and a battery. The button is movably disposed on the body to move between a first position and a second position. The movable pin is disposed in the body. The battery is disposed on the body. When the button is in the first position, the cover is separated from the button. When the button moves from the first position to the second position, the movable pin pushes the battery, allowing the battery to be separated from the body.

15 Claims, 7 Drawing Sheets

PORTABLE ELECTRONIC DEVICE

BACKGROUND OF THE INVENTION

1. Field of the Invention

The invention relates to a portable electronic device, and in particular, to a button mechanism for a portable electronic device.

2. Description of the Related Art

FIG. 1 and FIG. 2 depict a conventional mobile phone, comprising a body 2, a battery 3, a battery cover 4 and a button 5. The battery cover 4 has a opening 41. When the battery 3 is disposed in the body 2, the battery cover 4 covers the battery 3 and the button 5 engages with the battery cover 4 through the opening 41, preventing separation of the battery 3 from the body 2.

To remove the battery 3 from the body 2, the button 5 is pressed to release the battery cover 4 from the body 2. The battery 3 can then be removed from the mobile phone 1 by hand. Users with larger fingers or short finger nails, however, may experience difficulty in removing the battery 3 form the mobile phone 1.

BRIEF SUMMARY OF THE INVENTION

A portable electronic device with a button mechanism, enabling convenient removal of a battery, is provided. An exemplary embodiment of a portable electronic device comprises a body, a cover, a button, a movable pin and a battery. The button is movably disposed on the body to move between a first position and a second position. The movable pin is disposed in the body. The battery is disposed on the body. When the button is in the first position, the cover is separated from the button. When the button moves from the first position to the second position, the movable pin pushes the battery, allowing the battery to be separated from the body. The cover comprises an opening to expose the button in a third position where the button abuts the cover.

The portable electronic device further comprises a spring, a bracket, an elastic element, and a battery spring. The spring connects with the button so that the button can be pushed toward the cover. The bracket connects with the spring to support the button and the spring. When the button moves from the first position to the second position, the button presses the movable pin and the movable pin pushes the battery, so that the battery is separated from the body. The elastic element connects with the movable pin. When the battery is separated from the body, the elastic element provides a restoring force on the movable pin. The battery spring is disposed on the body. The battery spring abuts the battery when the battery is disposed on the body. When the battery is in the second position, the battery is separated from the body via the battery spring.

Additionally, the battery further comprises a protrusion abutting the movable pin when the button is in the first position. When the button is in the second position, the movable pin presses the protrusion.

The invention provides another portable electronic device with a button mechanism. The portable electronic device comprises a body, a cover, a button, a battery spring and a battery. The button is movably disposed on the body to move between a first position and a second position. The battery spring is disposed on the body. The battery is disposed in the body. When the button is in the first position, the cover is separated from the button. When the button is in the second position, the battery is separated from the body by the battery spring.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
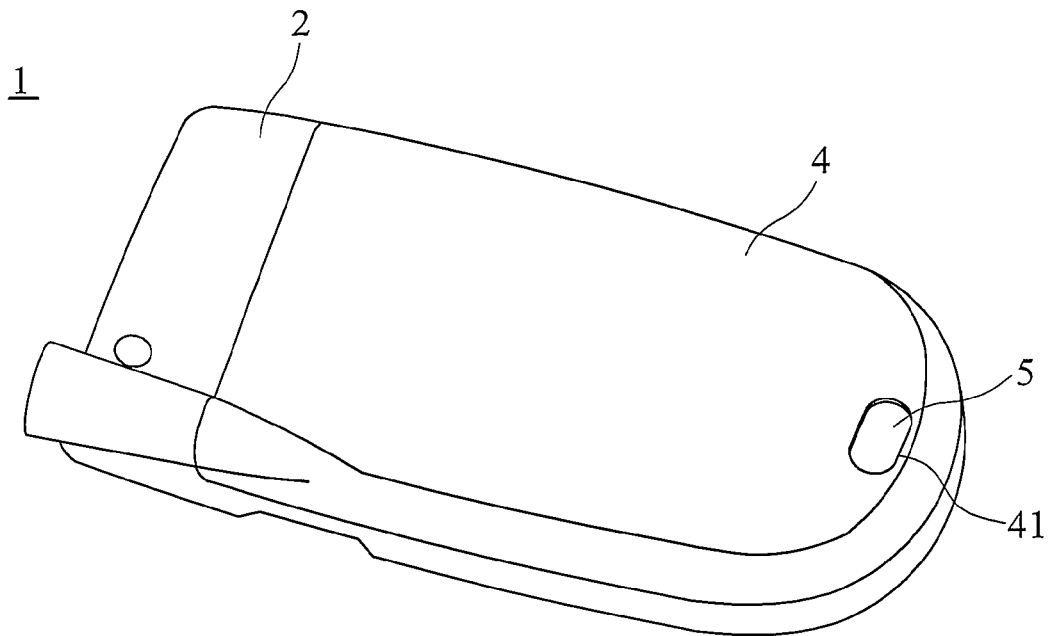
FIG. 1 is a schematic view of a conventional mobile phone.
Figure 2:
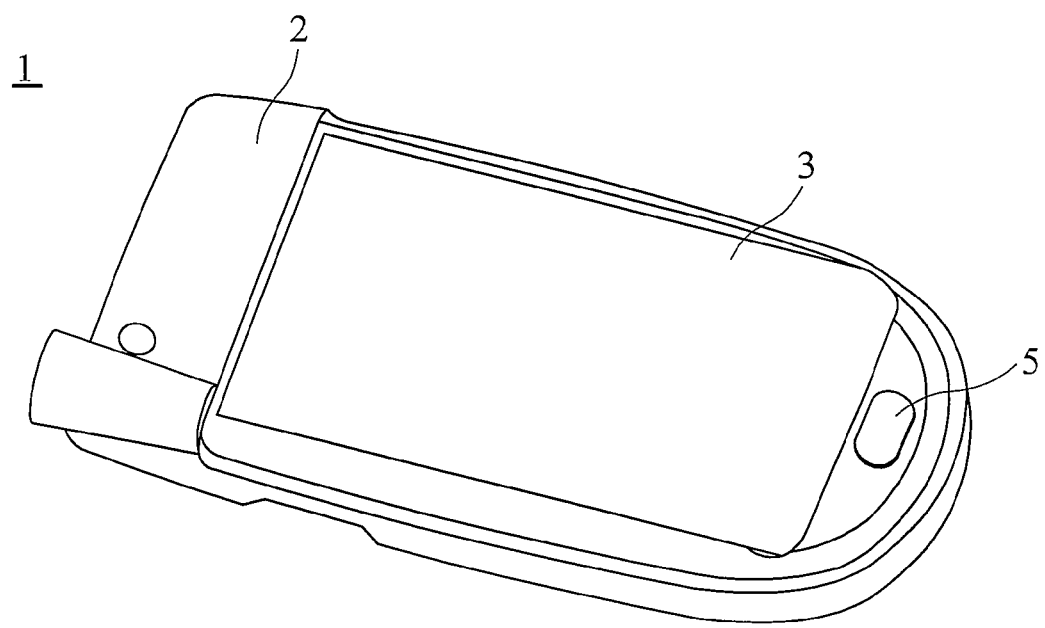
FIG. 2 is a schematic view of the conventional mobile phone when the battery cover is moved.
Figure 3:
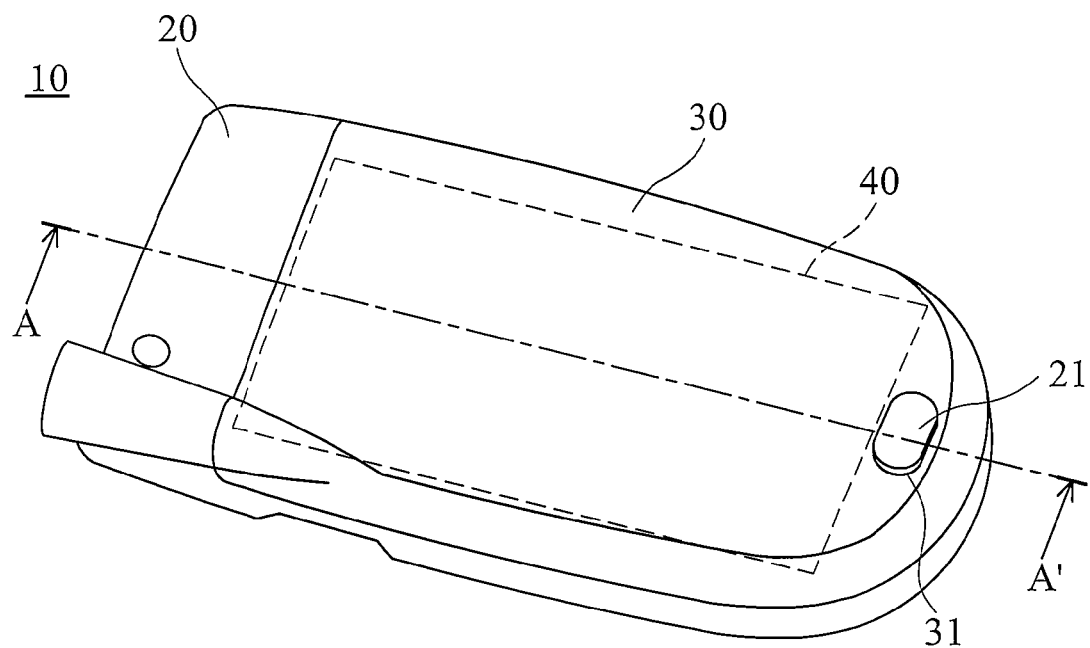
FIG. 3 is a schematic view of an embodiment of a mobile phone with button mechanism.
Figure 6:
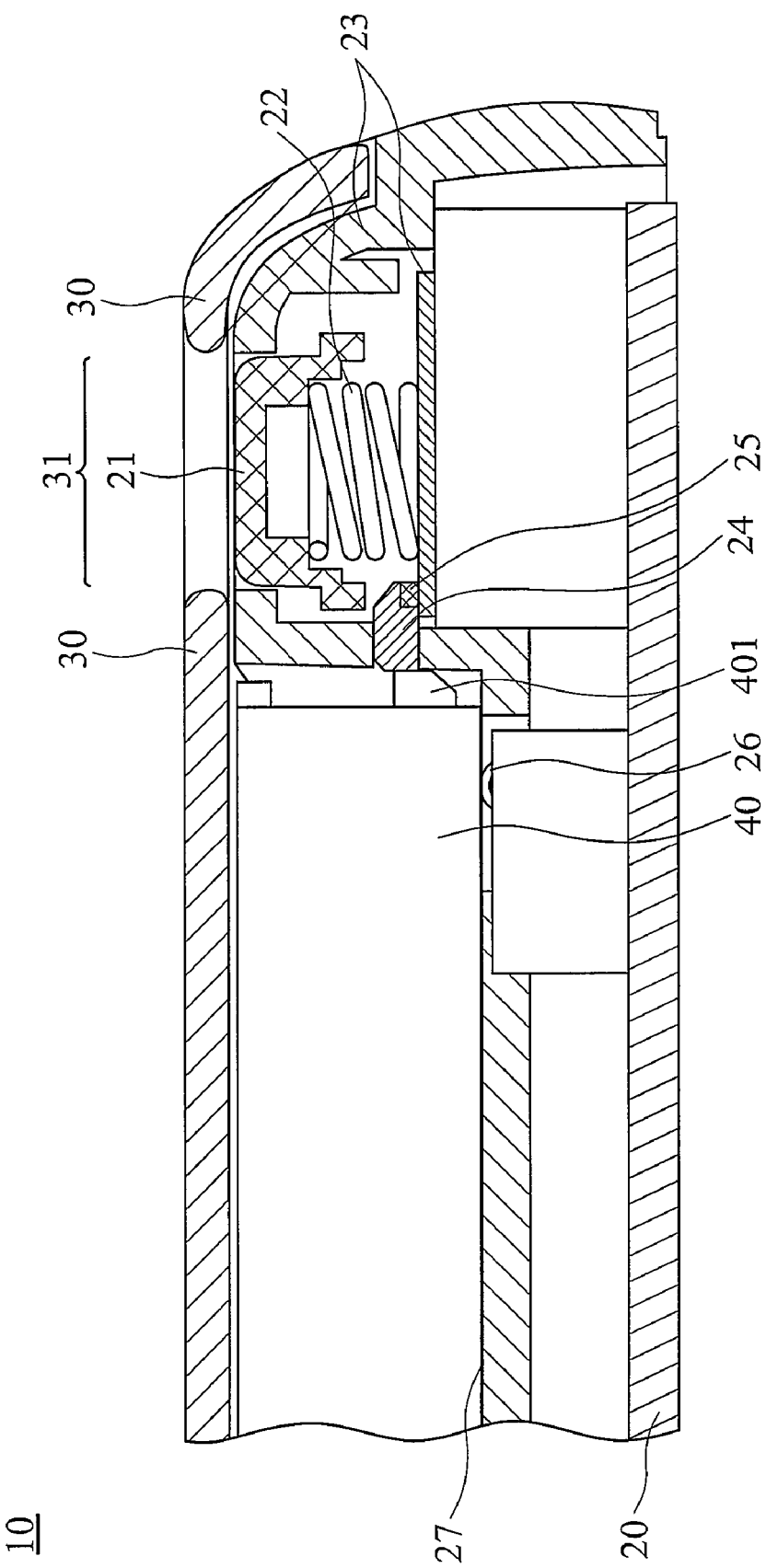
FIG. 6 is a sectional view along line A-A' in FIG. 3, showing the button in a first position.
Figure 7:
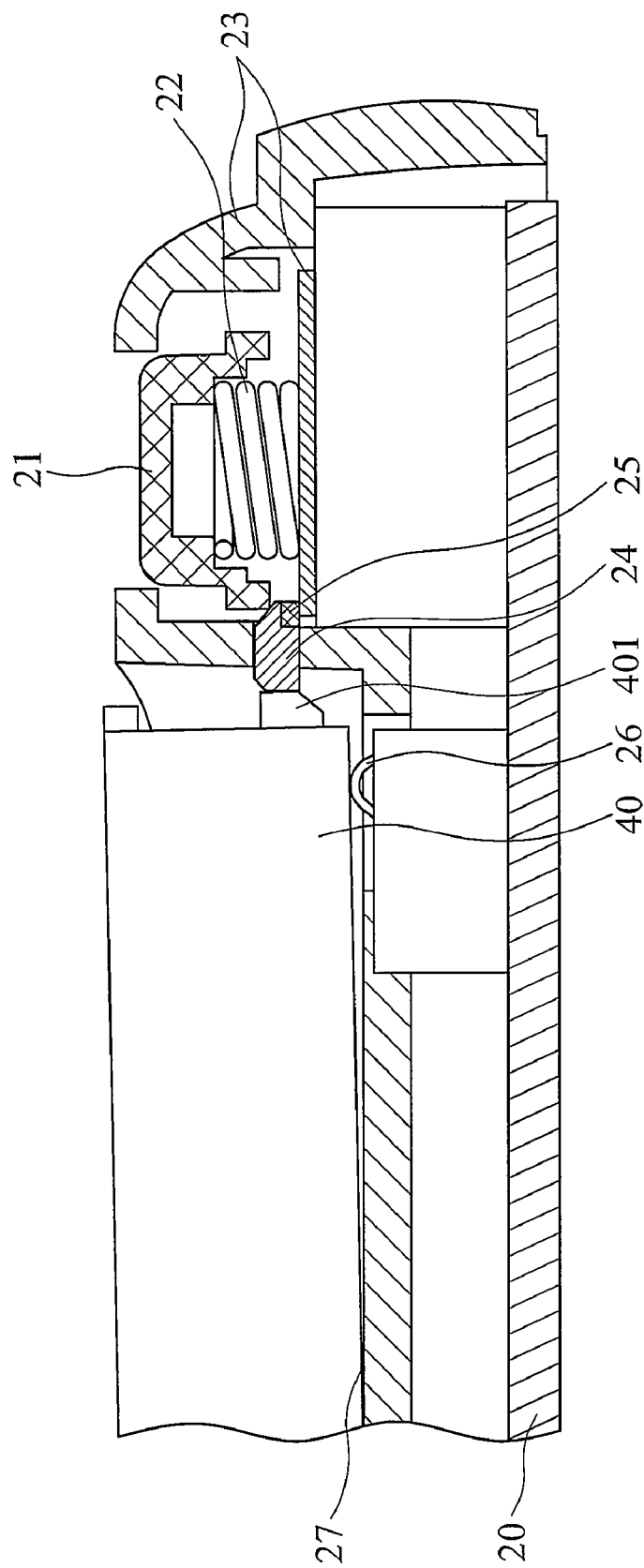
FIG. 7 is a sectional view along line A-A' in FIG. 3, showing the button in a second position.
Figure 8:
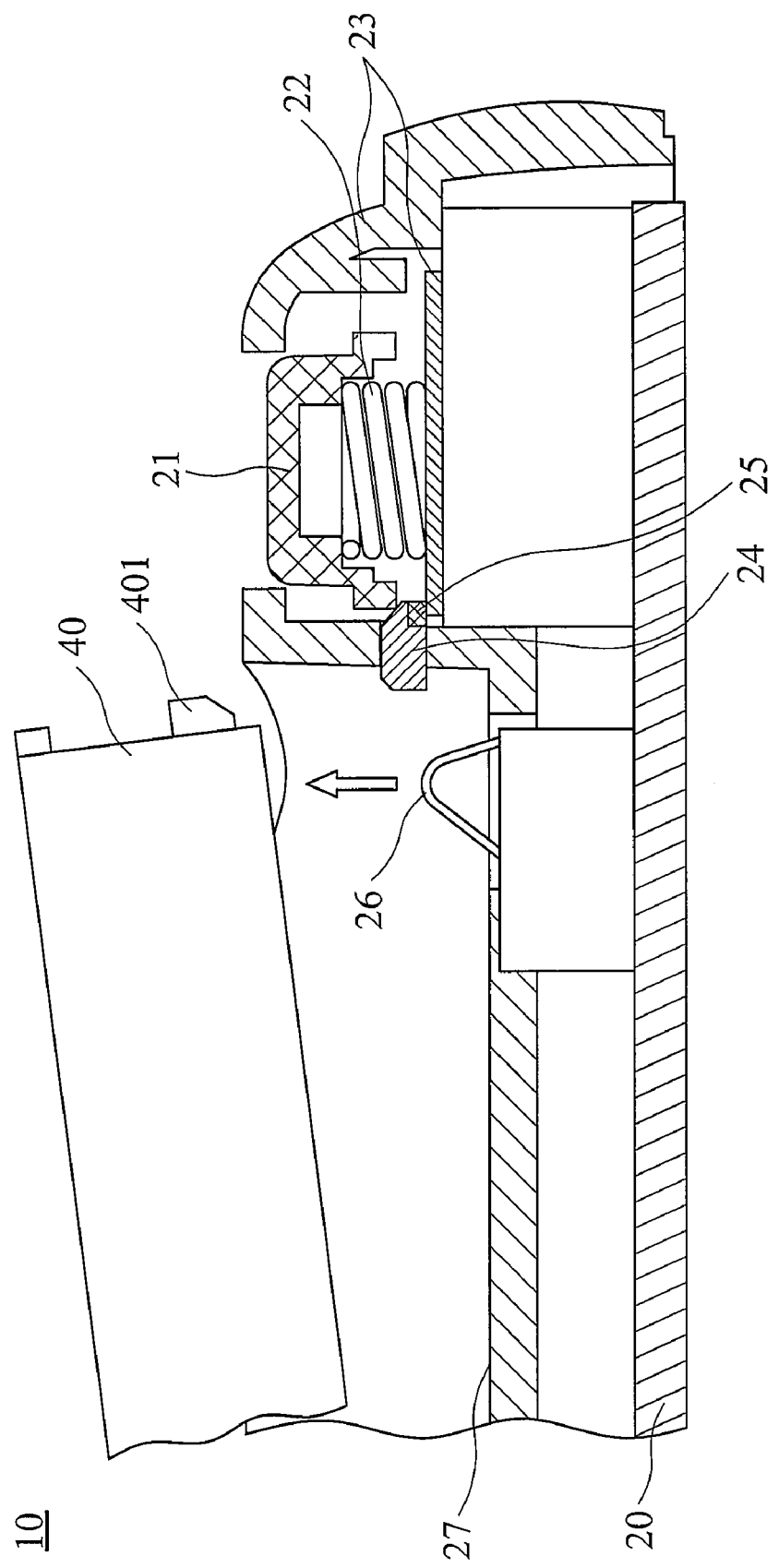
FIG. 8 is a side schematic view of FIG. 7, showing the button in the second position.

Referring to FIG. 3, a mobile phone 10 with button mechanism comprises a body 20, a cover 30, a button 21, and a battery 40. The cover 30 comprises an opening 31. The button 21 is disposed on the body 20. When the battery 40 is removed, the button 21 is movable between a separated position (first position, as shown in FIG. 6) and a pushed position (second position, as shown in FIG. 7). The button 21 is in an engaged position (third position, as shown in FIG. 3) when the battery 40 of the body 20 is tightly engaged with the cover 30. At this time, the button 21 abuts the cover 30 and is exposed outside the body 21. When the button 21 in the first position, the cover 30 is separated from the button 21. Additionally, when the button 21 is in the second position, the battery 40 is separated from the body 20.

Figure 4:
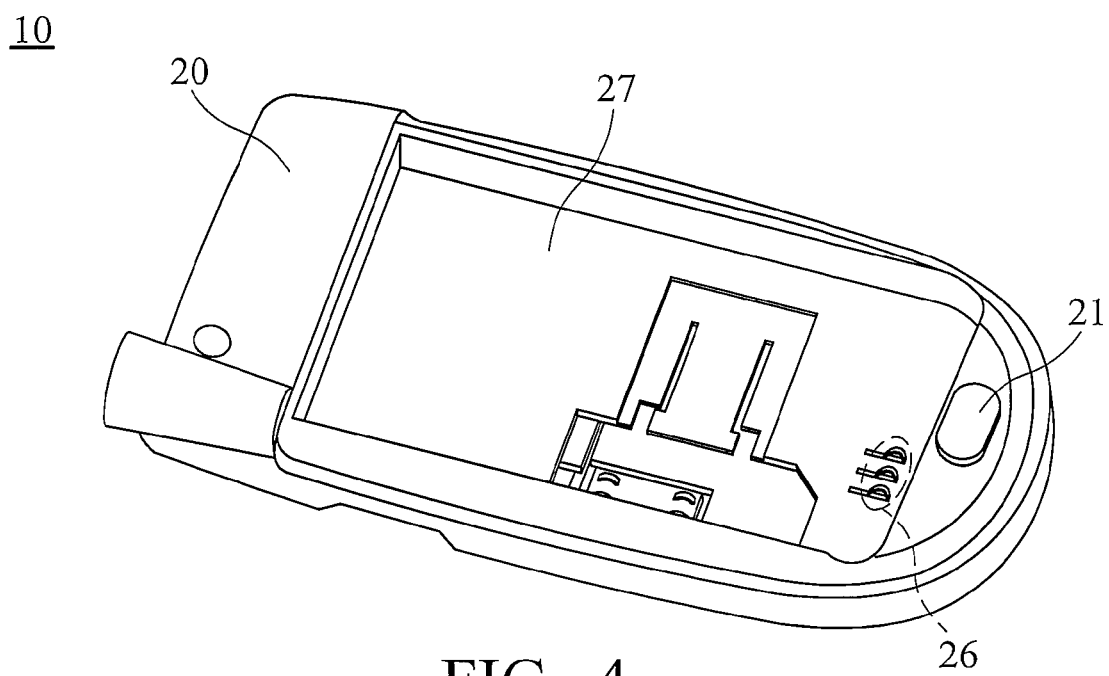
FIG. 4 is a schematic view of an embodiment of the mobile phone with button mechanism when the cover is moved.
Figure 5:
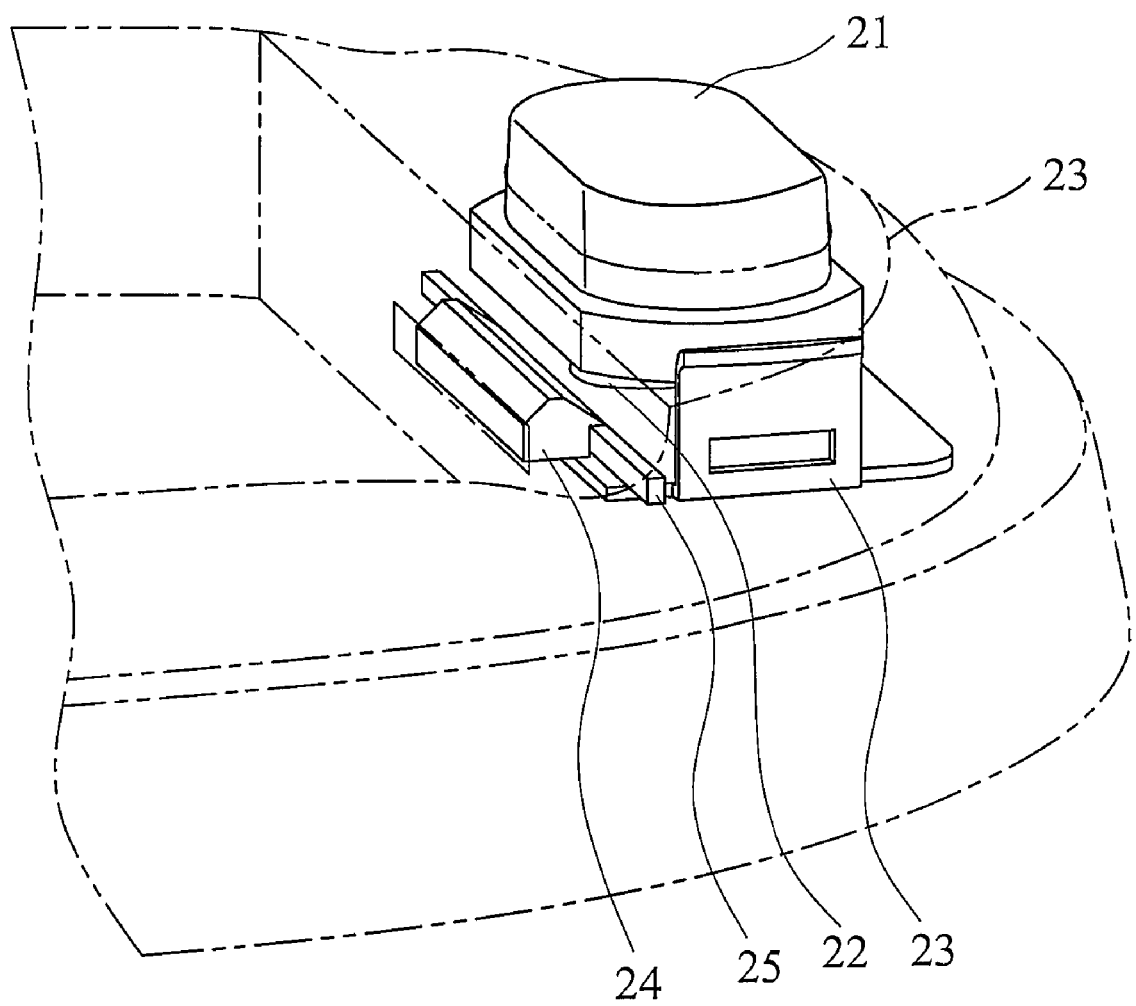
FIG. 5 is a 3-D magnified schematic view of an embodiment of the mobile phone with button mechanism.
Figure 9:
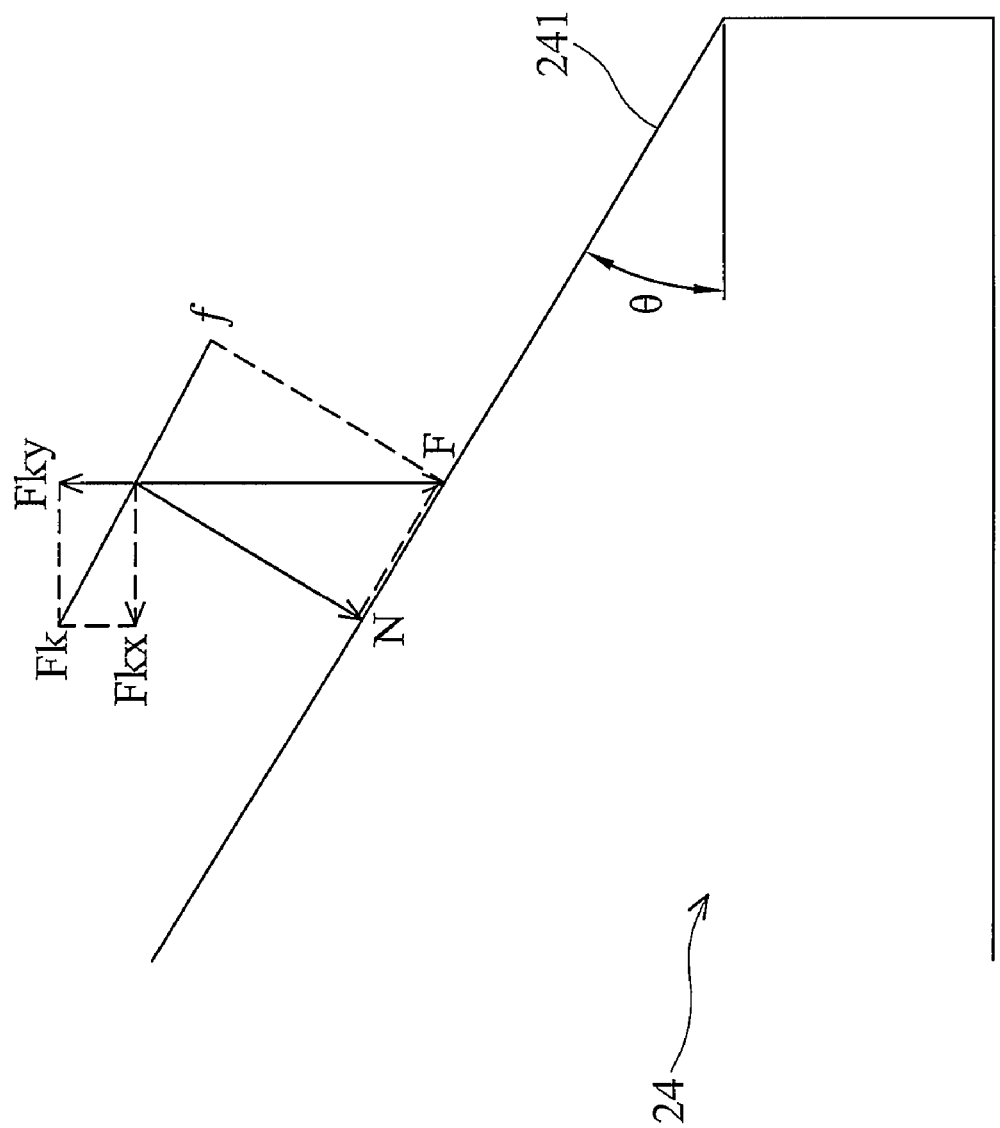
FIG. 9 is a mechanical schematic view of FIG. 7, showing in the button in the second position.

Referring to the FIG. 4 to FIG. 6, the body 20 comprises a spring 22, a bracket 23, a movable pin 24, an elastic element 25, a battery spring 26, and a receptacle 27. The button 21 is connected with the upper side of the spring 22. When the button 21 is pressed, the spring 22 is compressed. When the pressure is removed, however, the restoring force of the spring 22 pushes the button 21 back to its original position. The bracket 23 is connected with the underside of the spring 21 to support the button 21 and the spring 22. The movable pin 24 is movably disposed on the bracket 23 and comprises an inclined plane 241 with friction coefficient μ (an included angle θ between the inclined plane 241 and a horizontal plane), as shown in FIG. 9. Referring to FIG. 4 and FIG. 5, the elastic element 25 is connected with the movable pin 24. The battery spring 26 is disposed in the receptacle 27 of the body 20, and abuts the battery 40. Additionally, referring to FIG. 6 and FIG. 7, the battery 40 comprises a protrusion 401, abutting the movable pin 24.

Referring to FIG. 3 and FIG. 7, when the mobile phone 10 is used, the protrusion 401 of the battery 40 abuts the receptacle 27 of the body 20. Subsequently, the engaged cover 30 and button 21 prevent the battery 40 from dropping out of the mobile phone 10.

When the battery 40 requires changing, the button 21 is pressed to the first position (as shown in FIG. 6) and separated from the cover 30, the cover 30 can then be easily removed. Additionally, referring to FIG. 7 and FIG. 9, if the battery 40 is removed from the body 20, the button 21 is continuously pressed to the second position and the spring 22 is compressed again. Subsequently, the button 21 presses the movable pin 24 and a perpendicular force F pushes the inclined plane 241 of the movable pin 24. Thus, the perpendicular force F provides a normal force N and a horizontal force f for the inclined plane 241. Particularly, the horizontal force f generates a friction force Fk. The friction force Fk comprises a horizontal friction force Fkx and a perpendicular friction force Fky. The horizontal friction force Fkx pushes the movable pin 24 in a horizontal direction, and the movable pin 24 pushes the battery 40. When the battery 40 is pushed forward by the movable pin 24, the battery spring 26 of the body 20 pushes the battery 40 upward so that the battery 40 is lifted upward and is separated from the body 20. Thus, the battery 40 can be easily replaced. The button mechanism of the invention substitutes for the use of fingers in removing the battery, thus, the battery can be easily removed from the mobile phone.

Note that in this disclosure a mobile phone is given as an example, but the invention is not limited thereto, it can be applied to any portable electronic devices requiring battery.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device with a button mechanism, comprising: a body; a cover; a button movably disposed on the body to move between a first position and a second position; a movable pin disposed in the body; and a battery disposed in the body, wherein when the button moves to the first position, the cover is separated from the button, and when the button moves from the first position to the second position, the movable pin pushes the battery allowing the battery to be separated from the body.

2. The portable electronic device as claimed in claim 1, wherein the cover comprises an opening to expose the button in a third position where the button abuts the cover.

3. The portable electronic device as claimed in claim 1, further comprising a spring, connecting with the button, and pushing the button toward the cover.

4. The portable electronic device as claimed in claim 3, further comprising a bracket, connecting with the spring to support the button and the spring.

5. The portable electronic device as claimed in claim 4, wherein the movable pin is disposed on the bracket, and when the button moves from the first position to the second position, the button presses the movable pin and the movable pin pushes the battery.

6. The portable electronic device as claimed in claim 5, further comprising an elastic element connected with the movable pin, wherein when the battery is separated from the body, the elastic element provides a restoring force to the movable pin.

7. The portable electronic device as claimed in claim 6, wherein the battery further comprises a protrusion abutting the movable pin when the button is in the first position, and the movable pin presses the protrusion when the button is in the second position.

8. The portable electronic device as claimed in claim 1, further comprising a battery spring, disposed on the body, wherein the battery spring abuts the battery when the battery is disposed on the body, and the battery is separated from the body by the battery spring when the button is in the second position.

9. A portable electronic device with a button mechanism, comprising: a body; a cover; a button movably disposed on the body to move between a first position and a second position; a battery spring disposed on the body; and a battery disposed in the body, wherein when the button moves to the first position, the cover is separated from the button, and when the button moves from the first position to the second position, the battery is separated from the body by the battery spring.

10. The portable electronic device as claimed in claim 9, wherein the cover comprises an opening to expose the button in a third position where the button abuts the cover.

11. The portable electronic device as claimed in claim 9, further comprising a spring connecting with the button and pushing the button toward the cover.

12. The portable electronic device as claimed in claim 11, further comprising a bracket, connecting with the spring, to support the button and the spring.

13. The portable electronic device as claimed in claim 12, further comprising a movable pin, wherein the movable pin is disposed on the bracket, and when the button moves from the first position to the second position, the button presses the movable pin and the movable pin pushes the battery.

14. The portable electronic device as claimed in claim 13, further comprising an elastic element connected with the movable pin, wherein when the battery is separated from the body, the elastic element provides a restoring force to the movable pin.

15. The portable electronic device as claimed in claim 14, wherein the battery further comprises a protrusion abutting the movable pin when the button is in the first position, and the movable pin presses the protrusion when the button is in the second position.

* * * * *